(12) United States Patent
Simon et al.

(10) Patent No.: US 8,296,745 B2
(45) Date of Patent: Oct. 23, 2012

(54) METHOD AND APPARATUS FOR PORTABLE STUB GENERATION

(75) Inventors: Douglas N. Simon, Sunnyvale, CA (US); Bernd J. W. Mathiske, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1332 days.

(21) Appl. No.: 11/967,345

(22) Filed: Dec. 31, 2007

(65) Prior Publication Data

US 2009/0172652 A1 Jul. 2, 2009

(51) Int. Cl.
*G06F 9/45* (2006.01)

(52) U.S. Cl. .................... 717/148; 717/153; 717/154

(58) Field of Classification Search .............. 717/118, 717/134–151
See application file for complete search history.

(56) References Cited

U.S. PATENT DOCUMENTS

| | | | |
|---|---|---|---|
| 6,167,565 A | 12/2000 | Kanamori | |
| 6,314,445 B1 | 11/2001 | Poole | |
| 6,934,946 B2 | 8/2005 | Sokolov et al. | |
| 7,155,702 B2* | 12/2006 | Krishna et al. | 717/108 |
| 7,353,504 B2 | 4/2008 | Lagergren | |
| 7,793,275 B2* | 9/2010 | Bobrovsky et al. | 717/148 |
| 2004/0168162 A1* | 8/2004 | Park et al. | 717/166 |
| 2007/0136719 A1* | 6/2007 | Lagergren | 717/140 |
| 2008/0120129 A1* | 5/2008 | Seubert et al. | 705/1 |

OTHER PUBLICATIONS

Markus Hof, Just-In-Time Stub Generation, 1997—Springer, pp. 1-10.*
S O'Malley et al., USC: A universal stub compiler, ACM SIGCOMM Computer, 1994, pp. 1-12.*
Franz et al., Portability Redefined, aqired from http://www.ics.uci.edu/~franz/Site/pubs-pdf/C01.pdf, pp. 216-224.*
Liang, Sheng, Java Native Interface: Programmer's Guide and Specification, Prentice Hall PTR, Jun. 1999.
Glew, Neal; Triantafyllis, Spyridon; Cierniak, Michal; Eng, Marsh; Lewis, Brian; Stichnoth, James; LIL: An Architecture-Neutral Language for Virtual-Machine Stubs, Virtual Machines Research & Technology Symposium, May 6-7, 2004.

* cited by examiner

*Primary Examiner* — Wei Zhen
*Assistant Examiner* — Satish Rampuria
(74) *Attorney, Agent, or Firm* — Robert C. Kowert; Meyertons, Hood, Kivlin, Kowert & Goetzel, P.C.

(57) ABSTRACT

Method and apparatus for automatically generating intermediate-level interfaces between program methods written in a platform-independent language and program methods written in a native language. A portable stub generator generates stubs in an intermediate, tokenized internal representation. The stub generator is portable across platforms as the stubs it generates are not platform-specific. In addition, the generated stubs are available to the compiler at intermediate compilation stages rather than at the backend compilation stage, and thus may be optimized together with the rest of the platform-independent code, and also may be inlined. The portable stub generator may be directed at virtual machine environments. An exemplary virtual machine environment in which the stub generator may be implemented is the Java™ Virtual Machine (JVM). In JVMs, Java™ is the platform-independent language, and Java™ bytecode the tokenized internal representation. In a JVM, the stubs may be generated in accordance with Java™ Native Interface (JNI).

19 Claims, 4 Drawing Sheets

METHOD AND APPARATUS FOR PORTABLE STUB GENERATION

BACKGROUND OF THE INVENTION

1. Field of the Invention

This invention relates to computer systems, more particularly to interfaces between program methods written in one language and program methods written in another language, and yet more particularly to interfaces between program methods written in a platform-independent language and program methods written in a native language in virtual machine environments.

2. Description of the Related Art

Java™ Virtual Machine (JVM)

A Java™ Virtual Machine (JVM) is a set of computer software programs and data structures which implements a specific virtual machine model. This model accepts a form of computer intermediate language, commonly referred to as Java™ bytecode, which conceptually represents the instruction set of a stack-oriented architecture. This code is most often generated by Java™ language compilers, although the JVM can also be targeted by compilers of other languages. There are many virtual machines available, both free and commercial.

Java™ Bytecode

Java™ bytecode is the form of instructions that the Java™ virtual machine (JVM) executes. Each bytecode instruction is one byte in length. The most common language targeting JVM by producing Java™ bytecode is Java™. Many compilers are available that produce Java™ bytecode. Java™ bytecode may be considered a tokenized internal representation used by the Java™ programming language.

Java™ Native Interface (JNI)

The Java™ Native Interface (JNI) is a programming framework that allows Java™ code running in a Java™ virtual machine (JVM) to call and be called by native code (code specific to a hardware and operating system platform) written in other languages, such as C, C++ and assembly. JNI may be used, for example, to write native methods (e.g., C/C++ methods) to handle situations when an application cannot be written entirely in the Java™ programming language.

JNI Stubs

The Java™ Native Interface (JNI) supports calling native code from Java™ code. These calls cross a linguistic gap, and so typically incur a higher overhead than standard Java™-to-Java™ calls. In a JVM, the steps to invoke native code from Java™ are typically encoded in low-level machine code (e.g., assembly language) stubs that are generated and specialized for each native method called. Given that conventional stubs are machine code, stubs are typically compiled by the platform-specific compiler backend. This means that stub generation has to be re-written for each platform. In addition conventional JNI stubs are not easily inlined, as inlining is typically implemented in the platform-independent front end of the compiler.

Java, JVM, and JNI are trademarks or registered trademarks of Sun Microsystems, Inc. in the United States and other countries.

SUMMARY

Embodiments of a method and apparatus for automatically generating intermediate-level interfaces, or stubs, between program methods written in a platform-independent language and program methods written in a native language are described. Embodiments may provide a portable stub generator that generates stubs in an intermediate, tokenized internal representation that is not high-level platform-independent language source code but that is itself platform-independent. Embodiments may abstract stubs to a higher level than conventional hand-written or generated stubs, which are typically written or generated in a lower level language, e.g. assembly or machine language, specific to a particular platform. The abstraction of stubs into a higher-level representation allows the stub generator to be portable across platforms as the stubs it generates are not platform-specific. In addition, the generated stubs are available to the compiler at intermediate compilation stages rather than at the backend compilation stage, and thus may be optimized together with the rest of the platform-independent code, and also may be inlined.

Embodiments may be directed at virtual machine environments. An exemplary virtual machine environment in which embodiments of a portable stub generator may be implemented is the Java™ Virtual Machine (JVM). In JVMs, Java™ is typically the platform-independent language, and Java™ bytecode the tokenized internal representation. The Java™ Native Interface (JNI) is a programming framework that allows Java™ code running in a JVM to call and be called by native code (code specific to a hardware and operating system platform) written in other languages, such as C, C++ and assembly. In an embodiment directed at a JVM environment that implements JNI, a code generator may be configured to automatically generate JNI stubs as Java™ bytecode. The bytecode JNI stubs may then be compiled by different compilers at the front end of the compilation process like other Java™ bytecode and Java™ methods, and similarly may be interpreted by interpreters like other Java™ bytecode and Java™ methods. The generated JNI stubs, since they are compiled/interpreted at the front end rather than the backend, may thus be inlined, optimized, or otherwise processed by Java™ compilers and interpreters.

The generated JNI stubs may include Java™ bytecode that invokes one or more built-in methods, or built-ins. The built-in methods may be one or more fairly trivial methods or functions that require platform-specific support in compilers. A built-in is a method that is specially recognized by a compiler. Thus, to enable portability of the stub generator across platforms, compilers may only need to be modified to add support for the one or more built-in methods that require platform-specific support, which typically requires only a few lines to be added to, e.g., a particular compiler.

The native language function may be invoked in accordance with the generated stub at runtime of the platform-independent language program, e.g. the Java™ program. In one embodiment, the generated stub may be configured to invoke the native language function from a Java™ function in accordance with Java™ Native Interface (JNI). An exemplary JNI stub is described.

Figure 1:
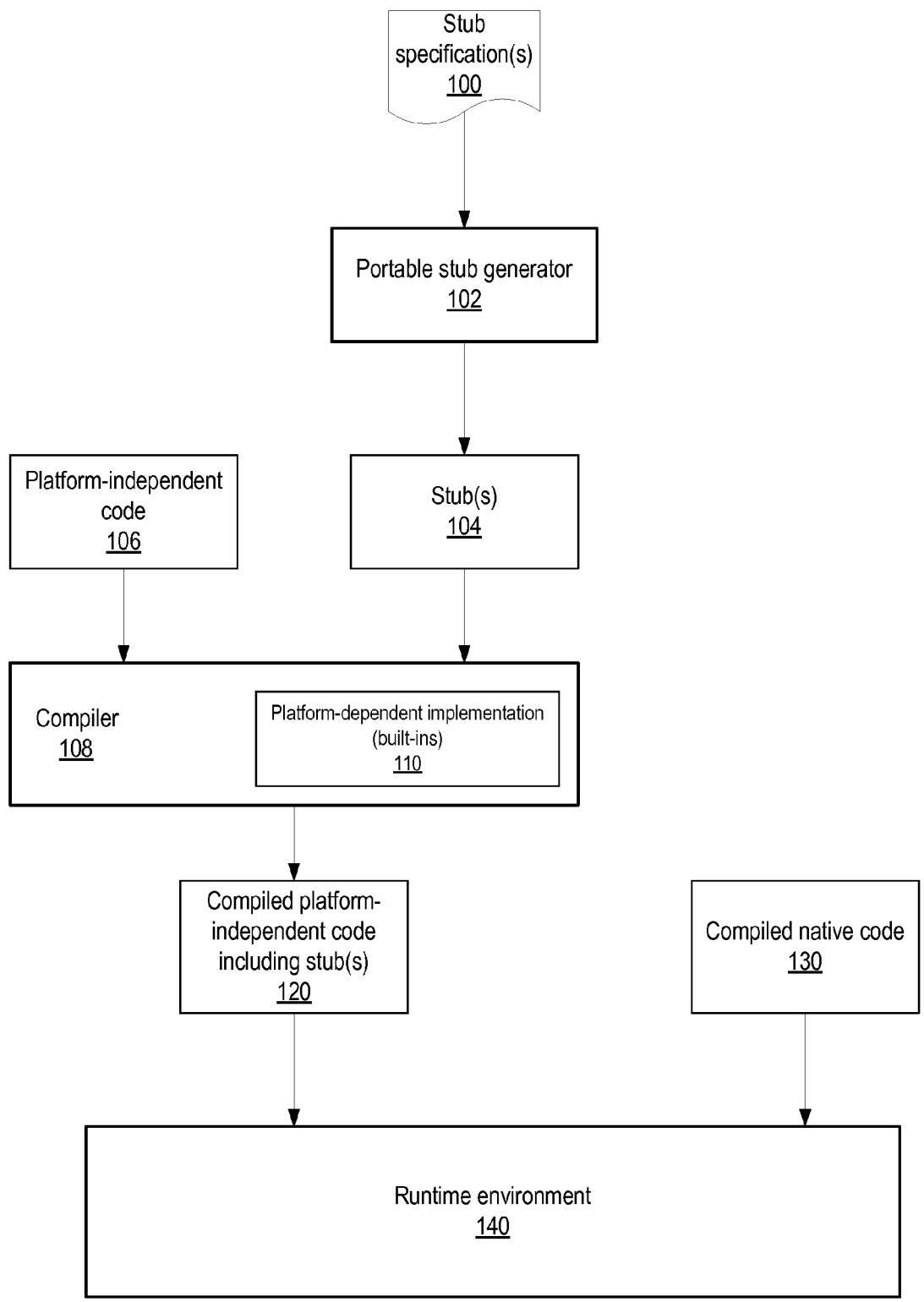
FIG. 1 illustrates a portable stub generator in a virtual machine environment and the process of generating, compiling, and running code that includes calls from platform-independent code and native code implemented via generated stubs, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for automatically generating intermediate-level interfaces between program methods written in a platform-independent language and program methods written in a native language are described. The intermediate-level interfaces may be referred to as stubs. Embodiments may provide a portable stub generator that generates stubs in an intermediate, tokenized internal representation that is not high-level platform-independent language source code but that is itself platform-independent. An example of such a tokenized internal representation is bytecode, e.g. Java™ bytecode, the form of instructions that the Java™ virtual machine (JVM) executes. Embodiments may abstract stubs to a higher level (e.g., Java™ bytecode) than conventional hand-written or generated stubs, which are typically written or generated in a lower level language, e.g. assembly or machine language, specific to a particular platform. The abstraction of stubs into a higher-level representation such as Java™ bytecode allows the stub generator to be portable across platforms as the stubs it generates are not platform-specific, and further allows the generated stubs to be compiled/interpreted at higher levels than conventional stubs. Since the stub generator generates stubs in the platform-independent tokenized internal representation (e.g., Java™ bytecode) and the generated stubs are not platform-specific, the stub generator is more portable across hardware and operating system platforms and across compilers when compared to conventional stub generation mechanisms. Furthermore, the generated stubs are available to the compiler at intermediate compilation stages rather than at the backend compilation stage as are conventional, low-level (e.g. assembly language) stubs, and thus may be optimized together with the rest of the platform-independent code and also may be inlined.

Embodiments may be directed at virtual machine environments. An exemplary virtual machine environment in which embodiments of a portable stub generator and the stubs generated thereby may be implemented is the Java™ Virtual Machine (JVM). In JVMs, Java™ is typically the platform-independent language, and Java™ bytecode the tokenized internal representation. The Java™ Native Interface (JNI) is a programming framework that allows Java™ code running in a JVM to call and be called by native code (code specific to a hardware and operating system platform) written in other languages, such as C, C++ and assembly. Exemplary embodiments of the portable stub generation method and apparatus are described herein primarily according do JVM, Java™, Java™ bytecode, and JNI. However, it is to be understood that embodiments directed at other environments including other virtual machine environments, other platform-independent languages, other tokenized internal representations, and/or other programming frameworks for calling native code from platform-independent language code may be implemented.

In an embodiment directed at a JVM environment that implements JNI, a code generator may be configured to automatically generate JNI stubs as bytecode. The bytecode JNI stubs may then be compiled by different compilers at the front end of the compilation process like other bytecode and Java™ methods, and also may be interpreted by interpreters like other bytecode and Java™ methods. The generated JNI stubs, since they are compiled/interpreted at the front end rather than the backend, may thus be inlined, optimized, or otherwise processed by Java™ compilers and interpreters.

The generated JNI stubs may include Java™ bytecode that invokes one or more built-in methods, or built-ins. The built-in methods may be one or more fairly trivial methods or functions that require platform-specific support in compilers. A built-in is a method that is specially recognized by a compiler. Thus, to enable portability of the stub generator across platforms, compilers may only need to be modified to add support for the one or more built-in methods that require platform-specific support, which typically requires only a few lines to be added to, e.g., a particular compiler. The effort to add the few lines to the compiler/interpreter necessary to support the built-ins needed by the bytecode stubs is much less than the effort that would be needed to re-port the stub generator and stubs for each platform.

In contrast, conventional stubs, e.g. conventional JNI stubs, are typically hand-written at a low level (e.g., as assembly code) to meet the requirements of particular platforms, and are thus not portable across platforms. Conventional stub generators exist; however, these stub generators are not easily portable across platforms, as they tend to generate low-level stubs, e.g. in assembly language, specific to particular platforms; a new stub generator would have to be specifically created to support a different platform. Furthermore, conventional stubs, whether hand-written or generated, are typically low-level (e.g., assembly) code that is compiled/interpreted at the back-end, and thus may not be subject to inlining or optimization as are the bytecode JNI stubs generated by embodiments of the portable stub generator.

In addition to enabling the stub generator to be more portable across platforms than conventional stub generation mechanisms and implementations, embodiments may provide benefits including one or more of, but not limited to:

- The generated bytecode stubs may be fed through a bytecode verifier, eliminating a source of subtle and hard to find bugs.
- The portability of the stub generator and the generated stubs is reduced to porting one or more simple built-ins into compilers.
- A compiler may inline the stubs as easily as it can inline any other bytecode method.
- The stubs may be compiled at the front-end of the compilation process, allowing optimizing compilers to optimize the stubs like any other bytecode.
- Implementing synchronization for a native method is no different from synchronizing any other platform-independent (e.g., Java) method.
- The inlining performed when compiling a stub can be (dynamically) tuned to find an optimal trade-off between stub size and performance.

The stubs can be tested by a framework for bytecode testing that uses interpretation and reflection.

FIG. 1 illustrates a portable stub generator in a virtual machine environment, and provides a broad overview of the process of generating, compiling, and running code that includes calls from platform-independent code and native code implemented with generated tokenized internal representation (e.g., bytecode) stubs according to one embodiment. Stub generation may be performed as part of a pre-compile process. Stub generator 102 may generate one or more tokenized internal representation (e.g., bytecode) stubs 104 in accordance with input one or more stub specifications 100. A stub specification 100 may, for example, indicate the name or signature of the native function (e.g., a native code library function) that is to be called from the platform-independent code (e.g., Java™ code), and also may indicate input and output parameters for the native code function.

Once stub(s) 104 are generated, the stub(s) may be compiled by compiler 108 with platform-independent code 106 to generate compiled platform-independent code including stub(s) 120. Because the stub(s) 104 are generated in a tokenized internal representation (e.g., in Java™ bytecode), the stub(s) 104 may be inlined in the compiled code, may be optimized along with the platform-independent code 106, and in general may be compiled early in the compilation process along with the platform-independent code 106 to gain the advantages of early, front-end compilation over back-end compilation, as is performed for conventional stubs.

Platform-dependent support for a portion of the bytecode in the stub(s) may be implemented as platform-specific built-ins in the compiler 108. For example, in an exemplary Java™/JNI stub described below, platform-specific built-ins are used to implement support for the two occurrences of the Java™ bytecode invokestatic JniHandles.createStackHandle(Object), and of the Java™ bytecode instruction invokenative at 38. These two instructions are bytecode instructions, but implementations of the functions are platform-specific. Thus, porting to support embodiments of stub generator 102 on a platform may require the platform-dependent implementation 110 of support for these bytecode instructions in compiler(s) 108.

Compiled platform-independent code including stub(s) 120 may be executed in the runtime environment 140 of the virtual machine (e.g., a JVM), and may call native functions in compiled native code 130 via the compiled stub code. The actual process of calling a native language method (e.g., a native language library method) using a generated stub 104 compiled with platform-independent code 106 is described below in reference to an exemplary JNI stub expressed as Java™ bytecode that may be generated by a stub generator 108 in a Java/JVM environment.

An embodiment of the portable stub generator may be used in Java™/JVM environments to generate JNI stubs expressed entirely as Java™ bytecode. A common use of JNI is to call native functions from Java™ code. In Java™, a modifier, the word "native", is added to a function call to signify that the function is implemented as a native (non-Java) function. "Native" signifies that there is no implementation of this method in Java, and therefore the implementation of the function is somewhere bound to or loaded into the JVM execution space. A "native" call is a JNI call down to C (or other non-Java™ language) code written to a well-defined C header file. The task of the mechanism is to transition all of the parameters through that interface into the C code (or whatever the native language is). The mechanism has to adhere to the C ABI (Application Binary Interface), which defines how binary components interoperate with each other via the linking system on the platform. ABI specifies, e.g., what registers are used for parameter passing. Java™ may assume that the native code has been written so that on the outside, at least, the native code looks like C. JNI is defined as a set of C/C++ header files. It is assumed that at least the entry point of the native code is some C code compiled against the JNI header file(s). Even if the native code is written in some language other than C/C++, the native code has to mimic C/C++ at that interface.

Typically, passing parameters that are not objects from Java™ to native code is fairly straightforward. There may be size and sign issues, but, for example, a 32-bit integer is a 32-bit integer, and can almost pass through as-is to native code. The more difficult task is passing objects out from Java™ to native code. One problem is that Java™ is a garbage-collecting language. C compilers, and many other native language compilers, do not necessarily provide information about where data or object pointers are, which the garbage collector needs to know should garbage collection happen while execution is within the native code. Native code, such as C code, may assume that objects in memory stay where they are; the objects do not move around. The Java™ garbage collector may update such pointers inside the JVM. When objects move and change location, all the pointers to the object are found and changed by the garbage collector, and then the program continues. The pointers that reside in memory that are only known to the native code are not normally found by the Java™ garbage collector. There is some special infrastructure in JNI to provide the locations of pointers to objects passed to native code to the Java™ garbage collector. The infrastructure includes a notion commonly referred to as handles.

In part to allow garbage collection to work correctly when calling native code, JNI passes memory addresses to the native code that do not move, and that act as a layer of indirection to other memory addresses that may move. This notion is generally referred to as handles. A handle may be considered a pointer to a memory pointer or address. Rather than passing the memory pointer directly, a pointer to a storage element that contains the memory pointer to an object is passed. The handle, the location of the storage element, is immutable; the garbage collector will not change it. The garbage collector registers that location as a place where it can find a memory pointer that it may change, namely a pointer to an object.

The above is a standard way of providing a layer of indirection to memory addresses. Handles are an opaque or abstract notion. A handle could just be an integer or index into a list or array; there are alternative ways of implementing handles. The requirement is that the handle has to be something constant, something that does not change with respect to the native code.

Thus, an aspect of calling interfaces between platform-independent code such as Java™ and native code is that there may need to be a segment of code that executes between the platform-independent method and the native function that takes object parameters and wraps them, for example, in handles. Similar wrapping may need to be done with a return value from the native code if the return value is an object reference. When the native code returns a wrapped object reference, the object reference has to be unwrapped or "unhandleized" so the raw object reference can be passed back to the platform-independent (e.g., Java™) calling function.

A stub is the segment of code that executes between the platform-independent (e.g., Java™) function and the called native code function. In Java™, stubs prepend at least two extra parameters to the native code function. One such parameter is a pointer whereby the native code can make queries or calls back to the JVM. In general, for native code to call back into the JVM, the native code has to have a pointer to the JVM. This pointer is to a data structure representing the runtime state of the JVM. A common use of this is if the native code is given an object reference and wants to read a field from the object. A C/C++ native function, for example, cannot directly do a C/C++ style struct element dereference of the object, and so has to call back into the JVM to read a value from the field. The pointer may be thread-specific. There may be multiple threads in the JVM, and therefore the pointer is local to a particular thread that is being executed within the JVM. In Java™/JNI, the data structure representing the runtime state of the JVM may be referred to as the JNIEnvironment or JNIEnv, and the pointer as the JNIEnvironment or JNIEnv pointer. There is one JNIEnvironment object per thread. A (handleized, or wrapped) pointer to the object is passed into the native code and back into Java™.

JNI and JNI stubs also need to provide support that facilitates stack walking across mixed Java™/native code stacks. There may be a call stack on a thread. Java™ may make a call into native code through a JNI stub, the native call may call back into Java™, and so on. Thus, a call stack may have a first set of one or more entries on the stack Java™ calling a native function, a second set the native function calling back into Java™, a third set Java™ calling back into the native code, and so on. Each set of entries on the stack represents an activation frame on the call stack. The Java™ code may throw an exception, and the exception handling mechanism of Java™ needs to know how to traverse up the set of activation frames on the call stack ("walk" the stack). There are other uses for walking a stack; for example, a debugger may need to walk the stack to display information about the stack, the garbage collector may need to walk the stack to update references on the stack, a profiler may need to walk the stack to find out what methods are hot, and a dynamic compiler may perform profiling based on statistics which are partially gathered by stack walking. Thus, there are many uses for stack walking, and the JNI stubs generated by embodiments provide support for stack walking.

The steps typically performed when calling native code from Java™ via JNI are:
1. Record the top of the current thread's local JNI handle stack.
2. Retrieve the pointer to the thread local JNI native data structure and marshal it as a parameter.
3. Wrap reference parameters (including the Class object for a static native method or 'this' object for a non-static native method) in JNI handles.
4. Call the native function, resolving it first if necessary.
5. Unwrap the returned value if the native method signature denotes a reference return type.
6. Restore the top of the thread's local JNI handle stack to the position saved in step 1.
7. Throw any pending exception.
8. Return result (if any) to caller.

Similar steps may be used to implement stubs in other platform-independent languages. Step 3 may be performed by parsing the signature of the method. Each primitive and null reference parameter value may be passed to the native function. Non-null reference parameter values may be converted to JNI handles before being passed through to the native function. A JNI handle is an opaque object reference that does not move and is known by the garbage collector.

The following is an example of a generated JNI stub expressed as Java™ bytecode according to one embodiment. This code is exemplary, and is not intended to be limiting. An exemplary Java™ source code signature for a native method in an exemplary class com.xxx.Foo may be as follows:

static native void register(String name, int value);

An exemplary JNI stub expressed in Java™ bytecode that may be generated by embodiments of the portable stub generator for this method is shown below with comments linking bytecode sub-sequences with the above-described steps a stub typically performs:

```
// Save the current thread
    0: invokestatic JvmThread.current( )
    3: astore_2
// Step 1 - Record the top of the current thread's local JNI handle stack.
    4: aload_2
    5: invokevirtual JvmThread.jniHandles( )
    8: astore_3
    9: aload_3
    10: invokevirtual JniHandles.top( )
    13: istore 4
// Step 2 - Retrieve the pointer to the thread local JNI native data structure and marshal it
// as a parameter.
    15: invokestatic JvmThread.currentJniEnvironmentPointer( )
// Step 3 - Wrap reference parameters (including the Class object for a static native
// method or 'this' object for a non-static native method) in JNI handles.
    18: ldc com.xxx.Foo
    20: invokestatic JniHandles.createStackHandle(Object)
    23: aload_0
    24: ifnull 34
    27: aload_0
    28: invokestatic JniHandles.createStackHandle(Object)
    31: goto 37
    34: invokestatic JniHandle.zero( )
    37: load_1
// Step 4 - Call the native function, resolving it first if necessary.
    38: invokenative "Java_com_xxx_Foo_register"
// Step 5 - Unwrap the returned value if the native method signature denotes a reference
// return type. (omitted in this example as the function does not return a reference value)
// Step 6 - Restore the top of the thread's local JNI handle stack to the position saved in
// step 1.
    41: aload_3
    42: iload 4
```

```
    44: invokevirtual JniHandles.resetTop(int)
// Step 7 - Throw any pending exception.
    47: aload_2
    48: invokevirtual JvmThread.throwPendingException( )
// Step 8 - Return result (if any) to caller.
    51: return
```

The following describes each of the above steps of the exemplary JNI stub in more detail.

The Java™ source code signature for the native method:
  static native void register(String name, int value);

The modifier static indicates that this is a static method. Static methods are methods that do not take an instance of that class in the body. Static methods can be called on that class, not on an instance of that class. The modifier native indicates that this is a native method; implementation of the method is in native code (C/C++, assembly, etc.). The modifier void indicates that the exemplary method does not have a return value. The method has two input parameters: name is an object reference of type String, and value is a primitive integer (int).

The stub initially has to obtain a handle to the current thread. The stub obtains the handle to the current thread in part so that the stub can obtain, via the handle to the current thread, other information from the thread as part of the stub's task. The handle to the thread may be stored to a local variable. The following is exemplary Java™ bytecode for getting a value (the handle to the current thread, in this case) and storing the value to a local variable:

```
// Save the current thread
    0: invokestatic JvmThread.current( )
    3: astore_2
```

Java™ bytecode is stack-based, so the variable is put onto the stack. The following is exemplary Java™ bytecode for putting a variable onto the stack.

```
// Step 1 - Record the top of the current thread's local JNI handle stack.
    4: aload_2
```

Next, the stub invokes a virtual function on the current thread to get another object that is used to manage handles. The object is stored to a local variable and put onto the stack:

```
    5: invokevirtual JvmThread.jniHandles( )
    8: astore_3
    9: aload_3
```

The handles mentioned so far are handles to object references that are to be parameters of the call to the native function. For this specific handle, the stub creates a handle for a name or signature parameter. When in native code, any time the native code calls back into Java™ and is given an object reference value, that object reference value has to be a handle as well. This is referred to as a local handle. There may be other types of handles used in Java™/JNI. So there are handles for object reference parameters of the native call and handles for every other object reference that is given to the native code as part of native code execution. In general, an object is obtained, put into a local variable, and put onto the stack.

Handles have to be managed; Java™/JNI uses an object called jniHandles in managing the handles. The handles have a stack-based lifetime, and may be considered a stack of object references. Therefore, the exemplary stub code saves the current top of the stack:

```
    10: invokevirtual JniHandles.top( )
    13: istore 4
```

Any handles allocated during the call to the native function go beyond the saved top of stack When returning from the native function, the stub needs to reset the top of stack (see step 6). This saving and resetting of the top of the stack, framing the call to the native function, effectively releases all handles that are created as part of the native function call.

Next, the stub obtains a JNI environment pointer and puts it onto the stack as the first parameter to the native function. This is a pointer to a thread local JNI native data structure that includes thread-local and JVM global information:

```
// Step 2 - Retrieve the pointer to the thread local JNI native data structure
// and marshal it as a parameter.
    15: invokestatic JvmThread.currentJniEnvironmentPointer( )
```

The result of the invokestatic is put onto the stack. The data structure may be used by the native code to make calls back into the JVM.

Step 3 may be somewhat different for static and non-static (virtual) methods Since this is a static method, the second parameter is a reference to the class object representing the class in which the native method was declared. For a virtual method, the second parameter may be a handleized form of the instance on which the virtual method was called:

```
// Step 3 - Wrap reference parameters (including the Class object for a
// static native method or 'this' object for a non-static native method) in
JNI handles.
    18: ldc com.xxx.Foo
    20: invokestatic JniHandles.createStackHandle(Object)
    23: aload_0
    24: ifnull 34
    27: aload_0
    28: invokestatic JniHandles.createStackHandle(Object)
    31: goto 37
    34: invokestatic JniHandle.zero( )
    37: iload_1
```

The bytecode instruction ldc loads a constant from the constant pool. The constant in this case is the class object of the exemplary class com.xxx.Foo. The invokestatic bytecode instruction is a call to a built-in function, a function implemented in the compiler:

invokestatic JniHandles.createStackHandle(Object)

This call indicates to the compiler that this class object needs to be on the bytecode stack; when compiled, this class object must be in a memory location that is on a native thread stack. The value returned is the address of that stack location. The JNI environment data structure and the class object, both parameters to be passed to the native code, are now on the stack.

The bytecode in step 3 handles the null case. It is possible that the object reference obtained at:

20: invokestatic JniHandles.createStackHandle(Object)

may be null. If the object reference is null, the stub needs to pass out null (zero) to the native code. Line 24 signifies that, if the object reference is null, go to 34:

24: ifnull 34

At 34, zero or null is pushed onto stack. A handle is not passed for null object references:

34: invokestatic JniHandle.zero( )

At 24, if the object reference is not null, the stub continues, makes a handle for the name parameter, and goes to line 37:

```
27: aload_0
28: invokestatic JniHandles.createStackHandle(Object)
31: goto 37
```

At 37, a bytecode instruction loads a raw value of an int (integer) parameter onto the stack:

37: iload_1

Four objects, the JNI Env object, a handleized receiver, a handleized name parameter, and the raw value of an int (integer) parameter are now on the stack. All of the bytecode instructions discussed so far are conventional Java™ bytecode. At 38, an exemplary new Java™ bytecode instruction (invokenative) is introduced to perform the actual call to the native function:

```
// Step 4 - Call the native function, resolving the name string first if
necessary.
    38: invokenative "Java_com_xxx_Foo_register"
```

In embodiments, support for this or a similar bytecode instruction may be implemented in Java™/JVM and compilers that support Java™/JVM, or according to other platform independent languages and virtual machines in other environments. The exemplary name ("Java_com_xxx_Foo_register") needs to be resolved. The string ("Java_com_xxx_Foo_register") is an exemplary symbol that may need to be located, for example in a library that is linked against the JVM, and that provides the implementation of the native method being called. The compiler may be configured to, in response to the invokenative bytecode instruction, implement platform-specific code to resolve the symbol: locate the native method, load the native method into the namespace, return the address of the native method, and call the native method. This is a centralized runtime function, and is not generated.

The platform-specific implementation of support for the invokenative bytecode instruction or a similar instruction in a compiler is straightforward, and thus does not result in a significant amount of effort when porting to another platform or supporting a new or different compiler. Thus, some porting effort may be required; this effort is an Operating System (OS) specific porting issue, and thus has to be done to support any stub generation mechanism. On many or most OSs, the platform-specific function may be implemented with the Open Group standard calls dlopen( ) (gain access to an executable object file) and dlsym( ) (obtain the address of a symbol from a dlopen object). Different methods of implementation may be used on some OSs. Thus, some porting may be necessary, but the porting is limited and in a different place, in a runtime system call. The way the bytecode invokenative translates is fairly trivial; the translation makes the resolution call, using an actual call assembly instruction. However, invokenative is a bytecode instruction, and thus abstracts the function to the bytecode level in the generated stub. The generated stub is expressed in bytecode, and thus gains the above-mentioned advantages over conventional, typically lower-level (e.g., assembly) stubs. For example, the generated stub may be inlined, is bytecode and thus subject to early compilation and thus optimization just like any other bytecode, and so on.

At this point, the call to the native function has been completed:

//Step 5—Unwrap the returned value if the native method signature denotes a reference As previously mentioned, nothing is performed at step 5 of this exemplary stub because the native function to be called does not return a reference value. If the native function does return a reference value, there would be bytecode generated by the stub generator to un-handleize (unwrap) the object reference return value.

After returning from the called native code and unwrapping the returned value if necessary, the exemplary stub gets the JNI handles object that manages object handles and also the top of stack value that was stored, and the top of stack is reset. This effectively deallocates every handle that was potentially allocated in the body of the native function call:

```
// Step 6
    41: aload_3
    42: iload 4
    44: invokevirtual JniHandles.resetTop(int)
```

When calling native language code from a platform-independent language such as Java™, typically platform-independent language exceptions (e.g., Java™ exceptions) cannot be thrown from within the native code. However, the native code may call back into the platform-independent language (e.g., Java™) code, which may cause an exception in e.g. Java™ code. In Java™, as an example, if a Java™ exception is thrown, before Java™ returns to the native code, any exception thrown in Java™ is caught and attached as an exception object to a thread-local location. Java™ exceptions cannot propagate directly into native (e.g., C/C++) code, as the native code does not know about Java™ exceptions. However, JNI provides provisions for native (e.g., C/C++) code to determine if a Java™ exception thrown as a result of calling back into the JVM, as well as provisions for clearing the Java™ exception. If a Java™ exception is thrown, and the native code does not clear the exception, the exception needs to be thrown after the native function completes and control is returned into Java™ (in this case, to the stub). Step 7 is an access of the thread-local variable; the illustrated call is a call to the JVM thread object which will check to see if a thread local variable has a value, and if so throw the exception.

```
// Step 7
   47: aload_2
   48: invokevirtual JvmThread.throwPendingException( )
```

At step 8, control is returned to the calling function:

```
// Step 8
   51: return
```

The above JNI stub example shows some aspects of a generated stub and generally describes the execution process of a stub for calling a native function from a platform-independent language such as Java™ and a virtual machine such as a JVM, using a protocol for calling native code from a platform-independent language code, in this example JNI. This particular exemplary stub calls a native function that does not return a value, and this example is static rather than virtual, but is illustrative of the general principle. An important thing to note is that the exemplary stub is expressed entirely as Java™ bytecode, the tokenized internal representation used by Java™.

In the exemplary stub, platform-specific built-ins are indicated by the two occurrences of invokestatic JniHandles.createStackHandle(Object) at 20 and 28, and the Java™ bytecode instruction invokenative at 38. These instructions are bytecode instructions, but implementations of the functions are platform-specific, and thus may be implemented as compiler built-ins. Thus, porting to support embodiments of the automatic stub generator in a compiler may require the implementation of platform-specific support for these bytecode instructions in the compiler.

Figure 2:
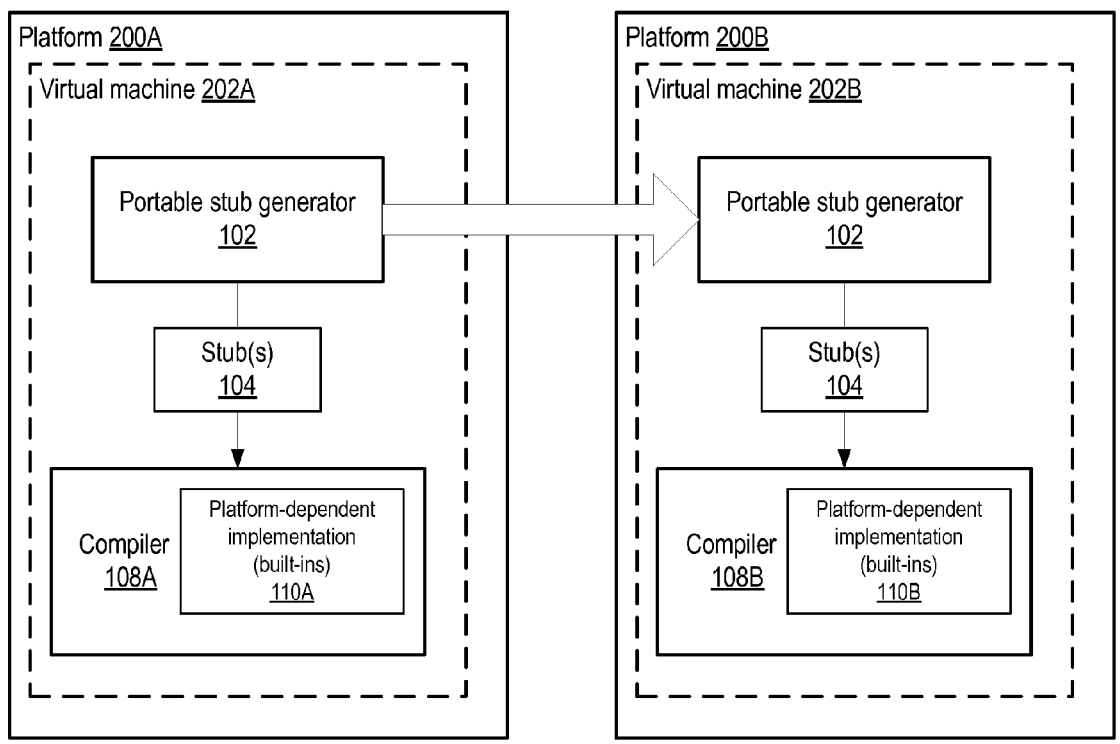
FIG. 2 illustrates the portability of the stub generator across platforms according to one embodiment.

FIG. 2 illustrates the portability of the stub generator across platforms according to one embodiment. Portable stub generator 102, implemented on platform 200A, may be ported to a new platform, e.g. platform 200B, with the porting effort only requiring support for one or more (two, in the above exemplary JNI/Java™ bytecode stub) platform-dependent built-ins 110 to be implemented in compiler(s) 108B for that platform 200B. This is achievable because the stubs 104 generated by portable stub generator 102 are generated according to a tokenized internal representation of the virtual machine 202 (e.g., Java™ bytecode in JVM), which is common across platforms 200A and 200B. Conventional stub generators that generate stubs in low-level machine code (e.g., assembly language) require greater porting effort, as the stub generators themselves have to be modified to generate low-level machine code stubs according to the specifics of the platform to which the stub generator is to be ported.

Figure 3:
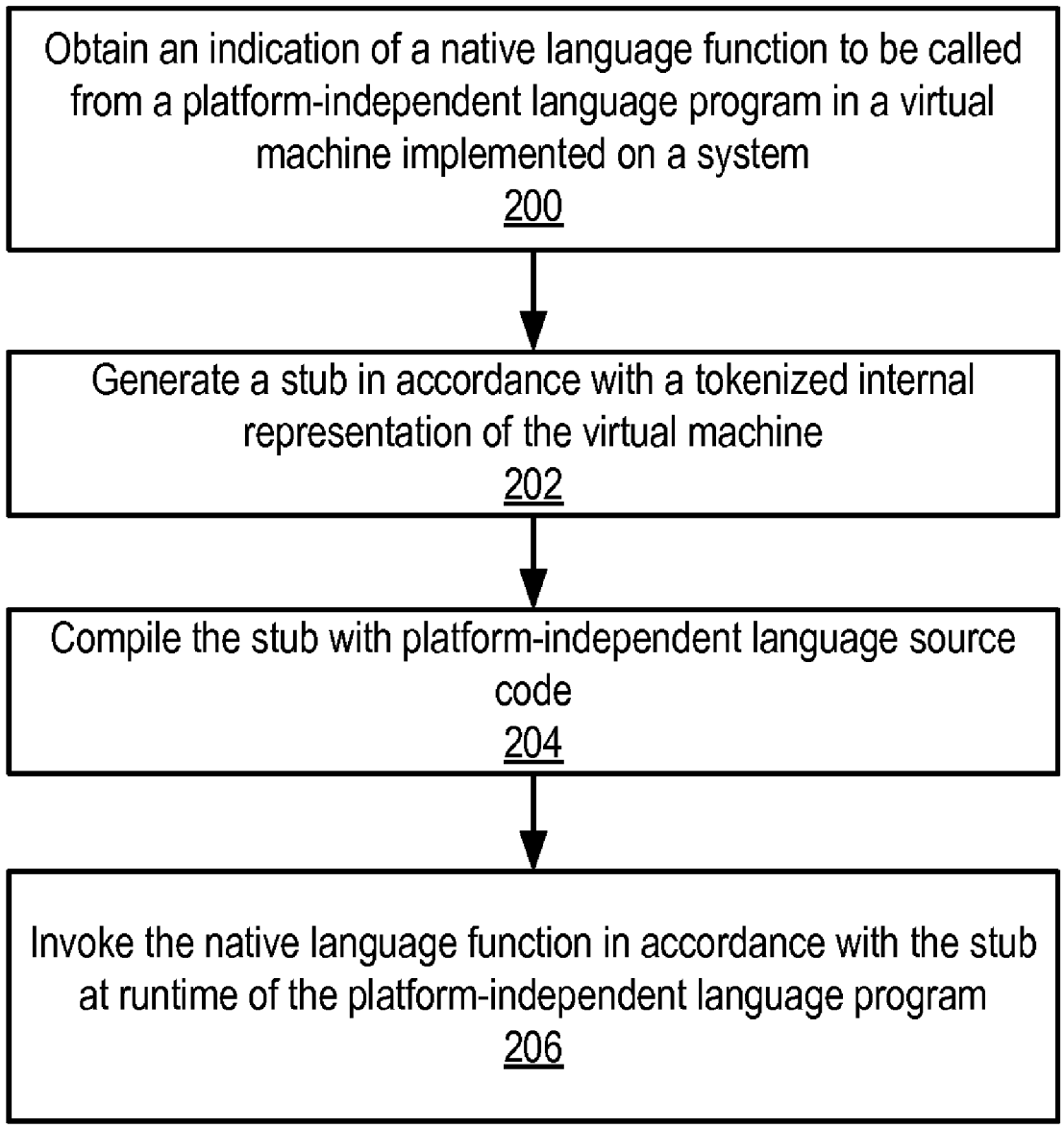
FIG. 3 is a flowchart of a method for automatically generating intermediate-level interfaces between program methods written in a platform-independent language and program methods written in a native language, according to one embodiment

FIG. 3 is a flowchart of a method for automatically generating intermediate-level interfaces between program methods written in a platform-independent language and program methods written in a native language, according to one embodiment. As indicated at 200, an indication of a native language function to be called from a platform-independent language program in a virtual machine may be obtained. The obtained indication may be the name or signature of a native language function (e.g., a native code library function) that is to be called from the platform-independent code (e.g., Java™ code), and also may indicate input and output parameters for the native language function. In one embodiment, the platform-independent language may be Java™, the virtual machine may be a Java™ virtual machine. The native programming language function is code specific to a hardware and operating system platform of the system. An exemplary native programming language is C/C++.

As indicated at 202, a stub may be generated in accordance with a tokenized internal representation of the virtual machine. In one embodiment, the virtual machine may be a Java™ Virtual Machine (JVM), and the tokenized internal representation may be Java™ bytecode. The generated stub may be configured to invoke the indicated native language function from a platform-independent language function at runtime of the platform-independent language program. In one embodiment, the generated stub may be configured to invoke the native language function from a Java™ function in accordance with Java™ Native Interface (JNI).

As indicated at 204, the stub may be compiled with platform-independent language source code for the platform-independent language program. Since the stub is expressed in a tokenized internal representation of the virtual machine (e.g., Java™ bytecode in a JVM) that supports the platform-independent language (e.g., Java™), the stub may be, for example, inlined in the compiled code, and optimized by the compiler along with the platform-independent language code. In one embodiment, the compiler may implement one or more built-ins to support platform-specific functionality of stubs generated by the stub generator.

As indicated at 206, the native language function may be invoked in accordance with the stub at runtime of the platform-independent language program. In one embodiment, the generated stub may be configured to invoke the native language function from a Java™ function in accordance with Java™ Native Interface (JNI). An exemplary JNI stub was previously described.

Illustrative System

Figure 4:
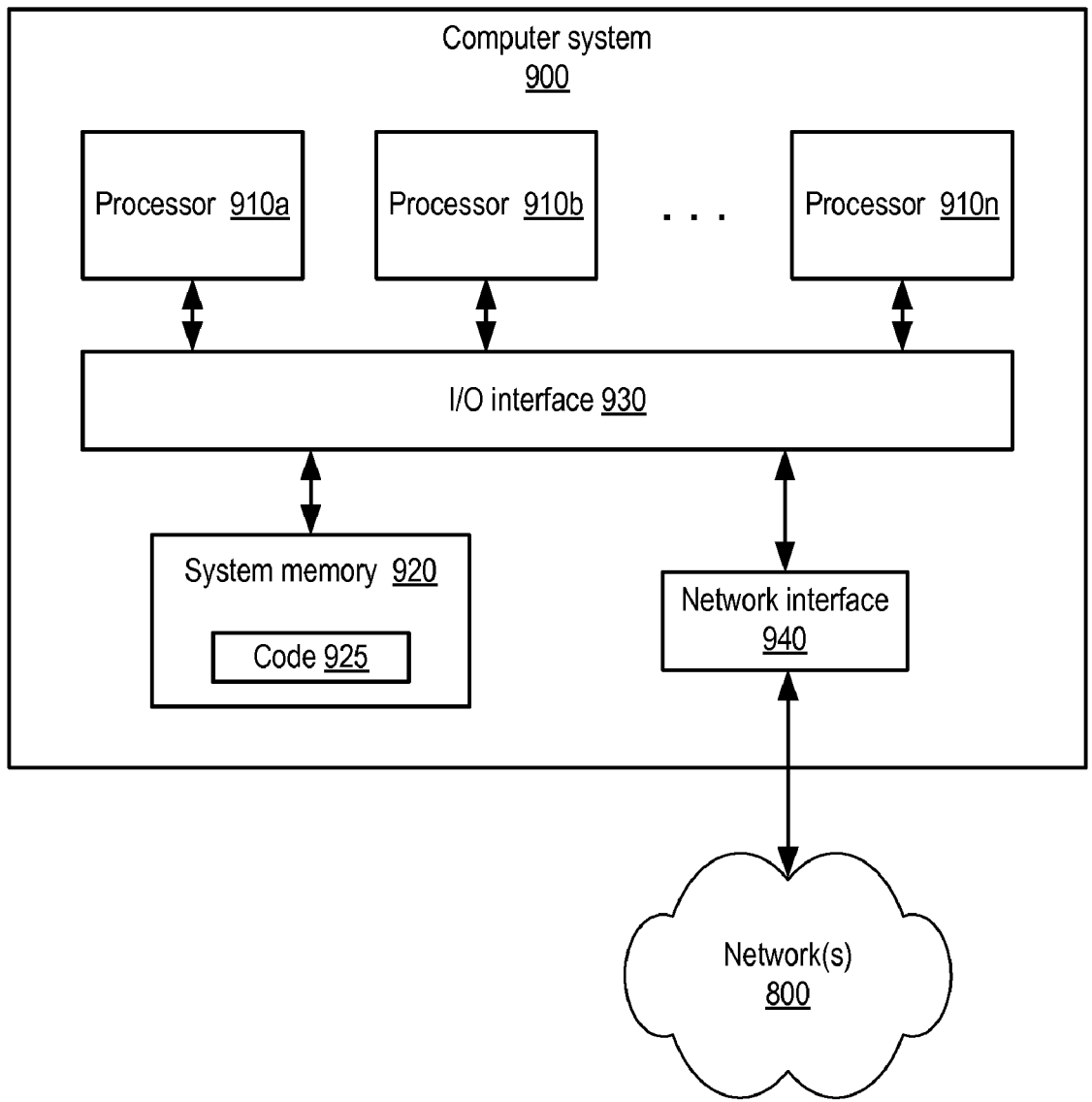
FIG. 4 is a block diagram illustrating an exemplary embodiment of a computer system.

In one embodiment, a system that implements a method and apparatus for automatically generating intermediate-level interfaces between program methods written in a platform-independent language and program methods written in a native language as described herein may include a general-purpose computer system that includes or is configured to access one or more computer-accessible media, such as computer system 900 illustrated in FIG. 4. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a method and apparatus for automatically generating intermediate-level interfaces between program methods written in a platform-independent language and program methods written in a native language, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems or communications devices as illustrated in FIG. 4, for example. In particular, network interface 940 may be configured to allow communication between computer system 900 and other systems through various communications channels via network(s) 800. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 3 for implementing a method and apparatus for automatically generating intermediate-level interfaces between program methods written in a platform-independent language and program methods written in a native language. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors; and
a memory comprising program instructions executable by the one or more processors to implement a portable stub generator configured to:
obtain an indication of a native language function to be called from a platform-independent language program in a virtual machine implemented on the system; and
generate a stub in accordance with a tokenized internal representation of the virtual machine, wherein the stub comprises tokenized internal representation instructions configured to invoke the indicated native language function from a platform-independent language function at runtime of the platform-independent language program;
wherein the tokenized internal representation instructions of the generated stub are configured to be compiled with platform-independent language code by a compiler for the virtual machine on the system or to be interpreted with platform-independent language code by an interpreter for the virtual machine on the system.

2. The system as recited in claim 1, wherein the virtual machine is a Java™ virtual machine, and wherein the tokenized internal representation is Java™ bytecode.

3. The system as recited in claim 1, wherein the platform-independent language is Java™.

4. The system as recited in claim 3, wherein the generated stub is configured to invoke the native language function from a Java™ function in accordance with Java™ Native Interface.

5. The system as recited in claim 3, wherein the generated stub includes Java™ bytecode configured to, when the native language function is called by a Java™ function at runtime:
record top of a current thread's local stack;
retrieve a pointer to a thread local environment data structure and put the pointer onto the stack as a parameter to the native language function;
wrap each of one or more reference parameters in a handle and put each of the one or more wrapped reference parameters onto the stack;

call the native language function;
if the native language function returns a value, unwrap the returned value from a handle in which it is wrapped;
restore the top of the current thread's local stack;
throw any pending exceptions; and
return to the calling Java™ function.

6. The system as recited in claim 1, wherein the native programming language function is code specific to a hardware and operating system platform of the system.

7. The system as recited in claim 1, wherein the generated stub is configured to be inlined in compiled code by the compiler or inlined in interpreted code by the interpreter.

8. The system as recited in claim 1, wherein the generated stub is configured to be optimizable with the platform-independent language source code by the compiler or the interpreter.

9. The system as recited in claim 1, wherein the compiler or the interpreter implements one or more built-ins to support platform-specific functionality of stubs generated by the stub generator.

10. The system as recited in claim 1, wherein the stub generator is configured to be portable across compilers and interpreters and across implementations of the virtual machine on different hardware and operating system platforms.

11. A computer-implemented method, comprising:
obtaining an indication of a native language function to be called from a platform-independent language program in a virtual machine implemented on a computer system; and
automatically generating a stub in accordance with a tokenized internal representation of the virtual machine, wherein the stub comprises tokenized internal representation instructions configured to invoke the indicated native language function from a platform-independent language function at runtime of the platform-independent language program;
wherein the tokenized internal representation instructions of the generated stub are configured to be compiled with platform-independent language code by a compiler for the virtual machine on the system or to be interpreted with platform-independent language code by an interpreter for the virtual machine on the system.

12. The method as recited in claim 11, wherein the platform-independent language is Java™, wherein the virtual machine is a Java™ virtual machine, and wherein the tokenized internal representation is Java™ bytecode.

13. The method as recited in claim 12, wherein the generated stub is configured to invoke the native language function from a Java™ function in accordance with Java™ Native Interface.

14. The method as recited in claim 11, wherein the native programming language function is code specific to a hardware and operating system platform of the system.

15. The method as recited in claim 11, further comprising compiling the generated stub with platform-independent language source code for the virtual machine on the system.

16. The method as recited in claim 15, wherein the stub generator is portable across compilers and interpreters and across implementations of the virtual machine on different hardware and operating system platforms.

17. A non-transitory computer-accessible storage medium, comprising program instructions, wherein the program instructions are computer-executable to implement a portable stub generator configured to:
obtain an indication of a native language function to be called from a platform-independent language program in a virtual machine implemented on the system; and
generate a stub in accordance with a tokenized internal representation of the virtual machine, wherein the stub comprises tokenized internal representation instructions configured to invoke the indicated native language function from a platform-independent language function at runtime of the platform-independent language programs;
wherein the tokenized internal representation instructions of the generated stub are configured to be compiled with platform-independent language code by a compiler for the virtual machine on the system or to be interpreted with platform-independent language code by an interpreter for the virtual machine on the system.

18. The non-transitory computer-accessible storage medium as recited in claim 17, wherein the virtual machine is a Java™ virtual machine, wherein the platform-independent language is Java™, and wherein the tokenized internal representation is Java™ bytecode.

19. The non-transitory computer-accessible storage medium as recited in claim 18, wherein the generated stub is configured to invoke the native language function from a Java™ function in accordance with Java™ Native Interface.

* * * * *